(12) United States Patent  
Usui et al.

(10) Patent No.: US 8,086,966 B2  
(45) Date of Patent: Dec. 27, 2011

(54) ELECTRONIC APPARATUS AND METHOD OF INITIALIZING SETTING ITEMS THEREOF

(75) Inventors: Shinobu Usui, Kanagawa (JP); Hidehito Yakushiji, Kanagawa (JP)

(73) Assignee: Sony Corporation, Tokyo (JP)

( * ) Notice: Subject to any disclaimer, the term of this patent is extended or adjusted under 35 U.S.C. 154(b) by 580 days.

(21) Appl. No.: 11/594,298

(22) Filed: Nov. 8, 2006

(65) Prior Publication Data

US 2007/0118815 A1    May 24, 2007

(30) Foreign Application Priority Data

Nov. 10, 2005   (JP) ................ P2005-326381

(51) Int. Cl.
*G06F 3/048*    (2006.01)
(52) U.S. Cl. ......... 715/773; 715/810; 715/824; 713/100
(58) Field of Classification Search ............ 715/773, 715/810, 824, 831; 713/100
See application file for complete search history.

(56) References Cited

U.S. PATENT DOCUMENTS

| | | | | |
|---|---|---|---|---|
| 4,887,220 A | * | 12/1989 | Kiya et al. | 700/169 |
| 5,384,910 A | * | 1/1995 | Torres | 715/810 |
| 5,623,604 A | * | 4/1997 | Russell et al. | 717/167 |
| 5,657,448 A | * | 8/1997 | Wadsworth et al. | 709/220 |
| 5,684,988 A | * | 11/1997 | Pitchaikani et al. | 707/104.1 |
| 5,790,652 A | * | 8/1998 | Gulley et al. | 379/368 |
| 5,877,781 A | * | 3/1999 | Tomizawa et al. | 345/531 |
| 5,995,744 A | * | 11/1999 | Guccione | 703/23 |
| 6,084,598 A | * | 7/2000 | Chekerylla | 345/441 |
| 6,161,176 A | * | 12/2000 | Hunter et al. | 713/1 |
| 6,204,840 B1 | * | 3/2001 | Petelycky et al. | 715/202 |
| 6,285,842 B1 | * | 9/2001 | Katamoto et al. | 399/81 |
| 6,456,304 B1 | * | 9/2002 | Angiulo et al. | 715/779 |
| 6,504,551 B1 | * | 1/2003 | Takashima et al. | 345/649 |
| 6,689,091 B2 | * | 2/2004 | Bui et al. | 604/67 |
| 6,697,941 B2 | * | 2/2004 | Kahler et al. | 713/100 |
| 6,710,785 B1 | * | 3/2004 | Asai et al. | 715/723 |
| 6,714,220 B2 | * | 3/2004 | Sigl | 715/780 |
| 6,725,233 B2 | * | 4/2004 | Froyd et al. | 1/1 |
| 6,741,270 B1 | * | 5/2004 | Rzepkowski et al. | 715/810 |
| 6,803,905 B1 | * | 10/2004 | Capps et al. | 345/173 |
| 6,803,950 B2 | * | 10/2004 | Miyamoto et al. | 348/231.6 |
| 6,856,332 B2 | * | 2/2005 | Kim | 715/810 |
| 6,968,543 B2 | * | 11/2005 | Takahara et al. | 717/140 |
| 7,089,530 B1 | * | 8/2006 | Dardinski et al. | 717/105 |

(Continued)

FOREIGN PATENT DOCUMENTS

JP    7 297891    11/1995

(Continued)

*Primary Examiner* — Weilun Lo
*Assistant Examiner* — Eric Wiener
(74) *Attorney, Agent, or Firm* — Frommer Lawrence & Haug LLP; William S. Frommer; Thomas F. Presson

(57) ABSTRACT

An electronic apparatus is provided. The electronic apparatus is controlled by using parameters relating to a plurality of setting items, including: a specifying unit performing an operation of specifying a setting item out of the plurality of setting items; and a display processing unit displaying a numeric keypad to input a parameter relating to the specified setting item and an initialization icon to initialize the specified setting item on a graphical user interface screen. Further, the electronic apparatus includes: an initial value storing unit storing initial values set/changed regarding the plurality of setting items; and an initialization processing unit returning the parameter of the specified setting item to the initial value based on an operation of the initialization icon.

8 Claims, 9 Drawing Sheets

U.S. PATENT DOCUMENTS

| | | | |
|---|---|---|---|
| 7,107,546 B2* | 9/2006 | Coulthard | 715/780 |
| 7,139,617 B1* | 11/2006 | Morgan et al. | 700/17 |
| 7,216,297 B1* | 5/2007 | Douglis et al. | 715/760 |
| 7,272,815 B1* | 9/2007 | Eldridge et al. | 717/101 |
| 7,334,190 B2* | 2/2008 | Wierowski | 715/712 |
| 7,337,410 B2* | 2/2008 | Lin | 715/773 |
| 7,369,130 B2* | 5/2008 | Kawabe et al. | 345/474 |
| 7,562,309 B2* | 7/2009 | Matthews et al. | 715/827 |
| 2002/0105520 A1* | 8/2002 | Farkas | 345/440 |
| 2002/0113824 A1* | 8/2002 | Myers, Jr. | 345/810 |
| 2002/0143290 A1* | 10/2002 | Bui et al. | 604/67 |
| 2003/0210272 A1* | 11/2003 | D'Souza | 345/773 |
| 2005/0180793 A1* | 8/2005 | Nishiguchi | 400/76 |
| 2005/0193343 A1* | 9/2005 | Kawabe et al. | 715/716 |
| 2006/0095850 A1* | 5/2006 | Miller et al. | 715/719 |
| 2006/0117270 A1* | 6/2006 | Amador et al. | 715/781 |
| 2006/0222189 A1* | 10/2006 | Terada | 381/119 |
| 2006/0238625 A1* | 10/2006 | Sasaki et al. | 348/231.3 |

FOREIGN PATENT DOCUMENTS

| | | | |
|---|---|---|---|
| JP | 11231914 A * | 8/1999 | |
| JP | 2002 350275 | 12/2002 | |
| JP | 2003 303183 | 10/2003 | |
| JP | 2004 318260 | 11/2004 | |
| JP | 2005 294307 | 10/2005 | |
| JP | 2006060750 A * | 3/2006 | |

* cited by examiner

ELECTRONIC APPARATUS AND METHOD OF INITIALIZING SETTING ITEMS THEREOF

CROSS REFERENCES TO RELATED APPLICATIONS

The present invention contains subject manner related to Japanese Patent Application JP 2005-326381 filed in the Japanese Patent Office on Nov. 10, 2005, the entire contents of which being incorporated herein by reference.

BACKGROUND OF THE INVENTION

1. Field of the Invention

The present invention relates to an electronic apparatus controlled by using parameters relating to a plurality of setting items, particularly to the electronic apparatus in which operability is improved when initializing individual setting items.

2. Description of the Related Art

There have been widely known various electronic apparatuses for commercial and consumer use in which arbitrary parameters relating to a plurality of items for controlling the electronic apparatuses are input to be set by a user using a numeric keypad or the like.

For example, an image switching apparatus called a "switcher" is known as a kind of electronic apparatus for broadcasting use. The switcher is an apparatus for selecting a video signal among video signals input from two or more channels (video signals from video camera, VCR, etc). Then, the switcher outputs a video signal to which an effect was applied to cause a transition from one video signal to the other video signal in the selected two video signals.

For example, with respect to an effect, there has been commercialized a switcher capable of arbitrarily inputting parameters by a numeric keypad on a GUI (Graphical User Interface) screen, relating to a plurality of setting items including the following items:

(1) effect pattern; and
(2) item relating to color of boundary line between two video signals on which transition is made.

A user can arbitrarily set those items to operate the switcher. Subsequently, the user may intend to initialize any of the setting items (for example, the user may intend to return the parameters to the initial values set in a factory beforehand). Accordingly, a switcher capable of performing an operation to initialize individual setting items on the GUI screen has been commercialized.

FIG. 1 shows such GUI screen. A "Default Recall" button for the initialization is provided in the upper right on the screen. A plurality of icons indicating grouped setting items are displayed in a main menu column in the center of the screen. An "Eff Ptn" among the icons displayed is an icon relating to the above-described effect pattern (1). A "Color" is an icon relating to the above-described color of the boundary line (2).

An operational procedure for initializing individual setting items on the GUI screen is explained in the followings. For example, in the case where a user initializes the setting regarding the color of the boundary line, the icon "Color" on a main menu is pushed. Then, as shown in FIG. 2, three icons "Lum", "Sat" and "Hue" that represent luminance, saturation and hue, respectively are displayed in the lower side on the screen.

For example, in the case where the luminance of the boundary line is initialized, the "Default Recall" button is pushed, and then the icon "Lum" is pushed, thereby returning a parameter of the luminance of the boundary line to the initial value. Similarly, the "Default Recall" button is pushed, and then the icon "Sat" is pushed, thereby returning a parameter of the saturation of the boundary line to the initial value, and further similarly, the "Default Recall" button is pushed, and then the icon "Hue" is pushed, thereby returning a parameter of the hue of the boundary line to the initial value.

However, such electronic apparatus has a number of functions other than the function described in this specification. Therefore, it is difficult for an operator practically using the apparatus to know all the functions and operational methods. Accordingly, an electronic apparatus in which an operational method of a desired function can be found easily without thoroughly reading an instruction manual has been desired.

Such GUI screen shown in this specification is one of the solutions provided for the above-described problem, on which a string of characters that explains the functions, operational buttons and states of various graphics and character strings, and the like are displayed, thereby enabling the user to speculate the operational method only by viewing those.

Note that FIGS. 1, 2 and other attached figures show only a portion relating to characteristics according to embodiments of the present invention, however, a number of icons, buttons and the like are displayed in practice on the GUI screen of electronic apparatuses for controlling a number of functions. Accordingly, there may be the case where it is difficult for a user to find a desired icon or the like from the display of a number of icons and buttons, even if a string of characters are displayed to explain the function thereof.

In this regard, there is a solution of preparing a screen having a hierarchical structure. Specifically, upon specifying (pushing) an icon indicating a category that a user intends to operate, a new screen (window) is popped up and displayed. Hence, operational objects are narrowed down by focusing only within the popped-up display to be operated, thereby obtaining a user-friendly interface in which search time is reduced.

In the procedure of the above-described related art electronic apparatus, when initializing a parameter, an icon of the relevant parameter is pushed after the "Default Recall" button was pushed. Here, although the "Default Recall" button is being displayed constantly on the screen, there is such a problem of the purpose thereof and order of use not being clear for a user, when only viewing the screen.

In addition, in the case where a numerical value is input regarding a parameter (setting item), there is provided a method in which a numeric keypad is displayed with a pop-up by performing an operation that specifies the relevant parameter and then the numerical value is input by the numeric keypad to be determined. With learning the input operation using such numeric keypad, there may be still such a problem that it is difficult to assume the operation of "Default Recall" button of the above-mentioned related art and it is necessary to learn that operation separately.

Further, if a user pushes the icon "Fff Ptn" in the main menu on the GUI screen in FIG. 1 to initialize the setting that relates to an effect, then an icon "Ptn No" that represents a pattern of the effect is displayed on the lower side of the screen, as shown in FIG. 3.

However, originally there is no initialized state in the switcher regarding the effect pattern (in other words, only the effect whose pattern number is input as a parameter by a user is implemented and an initial value of the pattern number does not exist). Therefore, the initialization thereof may not be performed in the above-described switcher.

However, a user is not informed of such case on the screen. Therefore, the user is convinced that setting of the effect pattern is initialized when the icon "Ptn No" is pushed after the "Default Recall" button was pushed, however, the effect pattern is not changed in practice.

As described above, it is difficult to distinguish an item having an initialized state (having an initial value in a parameter) from an item not having an initialized state out of a plurality of setting items in the initializing GUI screen for a commercialized related-art switcher. Hence, an unnecessary operation may be performed on the item not having an initialized state, which results in less operability.

It should be noted that Japanese Patent Application Publication No. H7-297891 (paragraph numbers 0011 to 0014, FIGS. 2 to 4), for example, discloses a technology in which the operability is improved by changing the function of a soft key in response to a shift of the electronic apparatus from a default (initial) state to the next state. However, the technology is not proposed to improve the operability when the initialization is performed, but is proposed to improve the operability when gradually parting from the initial state. No documents have been found in a search regarding technology by which the operability is improved when the initialization is performed.

SUMMARY OF THE INVENTION

In view of the above, it is desirable to improve the operability when an individual setting item is initialized in an electronic apparatus such as a switcher that is controlled by using parameters relating to a plurality of setting items.

According to an embodiment of the present invention, there is provided an electronic apparatus controlled by using parameters relating to a plurality of setting items, including: specifying means, display processing means, initial value storing means, and initialization processing means. The specifying means performs an operation of specifying a setting item out of the plurality of setting items. The display processing means displays a numeric keypad to input a parameter relating to the specified setting item and an initialization icon to initialize the specified setting item on a graphical user interface (GUI) screen. The initial value storing means stores initial values set/changed regarding the plurality of setting items. The initialization processing means returns the parameter of the specified setting item to the initial value based on an operation of the initialization icon.

According to another embodiment of the present invention, there is provided a method of initializing setting items in an electronic apparatus controlled by using parameters relating to a plurality of setting items. The method includes the steps of: storing initial values set/changed regarding the plurality of setting items; displaying a numeric keypad to input a parameter relating to a specified setting item and an initialization icon to initialize the specified setting item on a graphical user interface (GUI) screen based on an operation that specifies a setting item out of the plurality of setting items; and returning a parameter of the specified setting item to the initial value based on an operation of the initialization icon.

According to the embodiments, an initialization icon is displayed on the GUI screen, accompanying the display of a numeric keypad to which attention is directed by a user when inputting parameters. Upon watching the display, the user can easily understand that the push-down of the initialization icon acts only on a setting item (parameter) operated at present. Even if a number of other items have been displayed on the GUI screen before the numeric keypad is popped up, an operation including the initialization can be performed with viewing only an area displaying the numeric keypad during the operation using the numeric keypad. Accordingly, the electronic apparatus capable of being easily learned and having excellent operability can be provided.

According to further embodiment of the present invention, there is provided an electronic apparatus controlled by using parameters relating to a plurality of setting items, including: specifying means, display processing means, and initialization processing means. The specifying means performs an operation of specifying a setting item out of the plurality of setting items. The display processing means displays on a graphical user interface screen a numeric keypad to input a parameter relating to the specified setting item and an initialization icon to initialize the specified setting item in the case of the setting item specified by the specifying means being an item having an initial value in the parameter and may not display the initialization icon in the case of the specified setting item being an item not having an initial value in the parameter. The initialization processing means returns the parameter of the specified setting item to the initial value based on an operation of the initialization icon.

According to further another embodiment of the present invention, there is provided a method of initializing setting items in an electronic apparatus controlled by using parameters relating to a plurality of setting items. The method includes the step of displaying on a graphical user interface screen a numeric keypad to input a parameter relating to a specified setting item and an initialization icon to initialize the specified setting item in the case of the specified setting item having an initial value in the parameter and not displaying the initialization icon in the case of the specified setting item not having an initial value in the parameter, based on an operation specifying the setting item out of the plurality of setting items. The method further includes the step of returning the parameter of the specified setting item to the initial value, based on an operation of the initialization icon.

According to the embodiments, when a user performs an operation of specifying a setting item desired to be initialized, a GUI screen is displayed as explained in the followings. Specifically, the GUI screen in the case of the specified setting item having an initialized state (having an initial value in the parameter) is different from that in the case of the specified setting item not having an initialized state.

Having Initialized State

A numeric keypad to input parameters, and an initialization icon to initialize a specified setting item are displayed.

Not Having Initialized State

A numeric keypad is displayed, but an initialization icon is not displayed.

A user can easily and exactly check whether or not the specified setting item is capable of being initialized, based on the display with or without the initialization icon.

Then, in the case of the initialization icon being displayed, the setting item specified by the user is initialized by operating the icon (the parameter is returned to the initial value).

Further, even in the case where an initialization icon is not displayed (the initialization may be impossible), as an alternative measure instead of the initialization, the setting regarding that item can be performed again immediately by the numeric keypad being displayed.

As described above, according to the embodiments, a user can easily and exactly check whether or not a setting item specified to be initialized is capable of being initialized in an electronic apparatus controlled by using parameters relating to a plurality of setting items, where items capable of being initialized and items incapable of being initialized coexist. Therefore, an initializing operation (operation of an initialization icon) can be performed only in the case of the item capable of being initialized. Hence, an unnecessary operation on the items incapable of being initialized can be prevented and the operability when initializing an individual setting item can be improved.

According to the embodiments, a user can easily find an initialization procedure for the setting item to be input at present without searching on a wide GUI screen. Therefore, the procedure can be learned without difficulty and the operability can be improved.

Further, according to the embodiments, an unnecessary operation on items incapable of being initialized can be prevented, when a user initializes an individual setting item in an electronic apparatus controlled by using parameters relating to a plurality of setting items, where items capable of being initialized and items incapable of being initialized coexist, thereby improving an operability.

DESCRIPTION OF THE PREFERRED EMBODIMENTS

Figure 1:
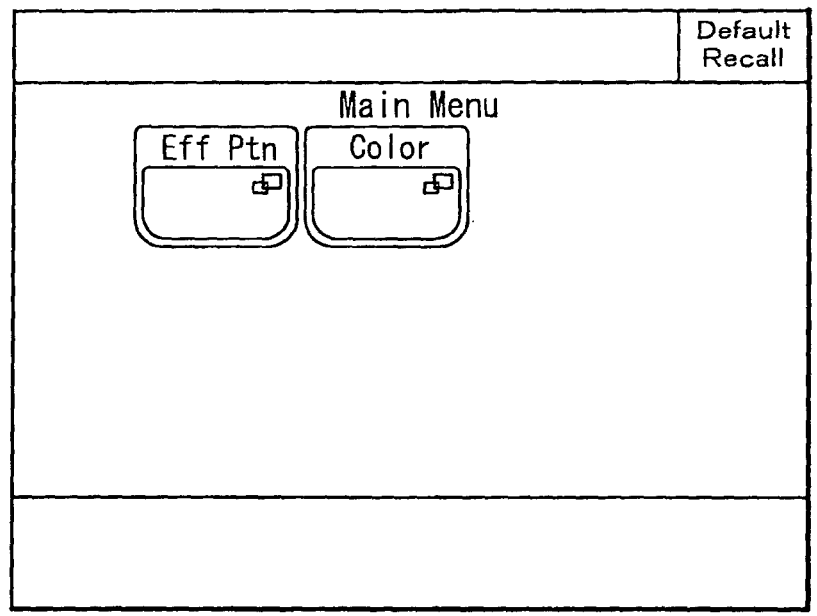
FIG. 1 is a view showing a GUI screen for initialization in a switcher of related art.
Figure 2:
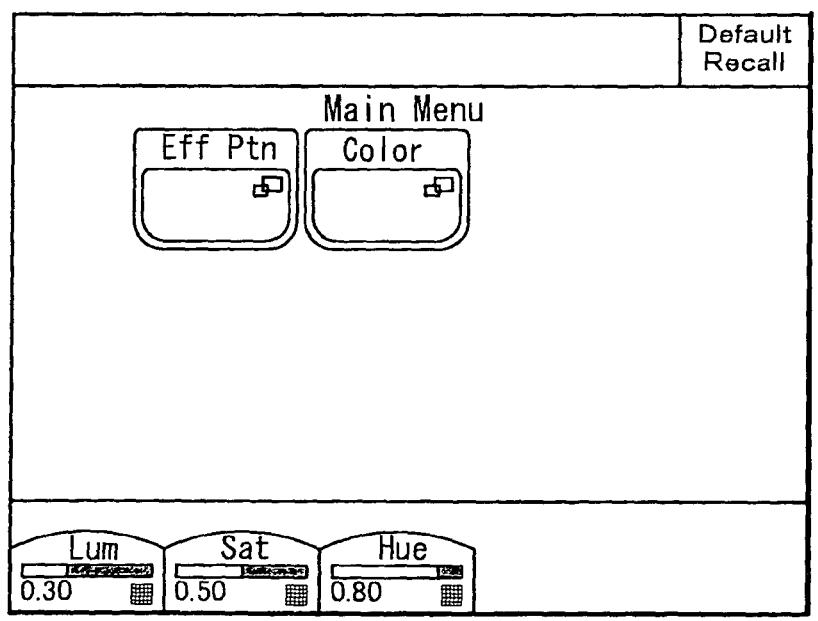
FIG. 2 is a view showing a GUI screen for initialization in a switcher of related art.
Figure 3:
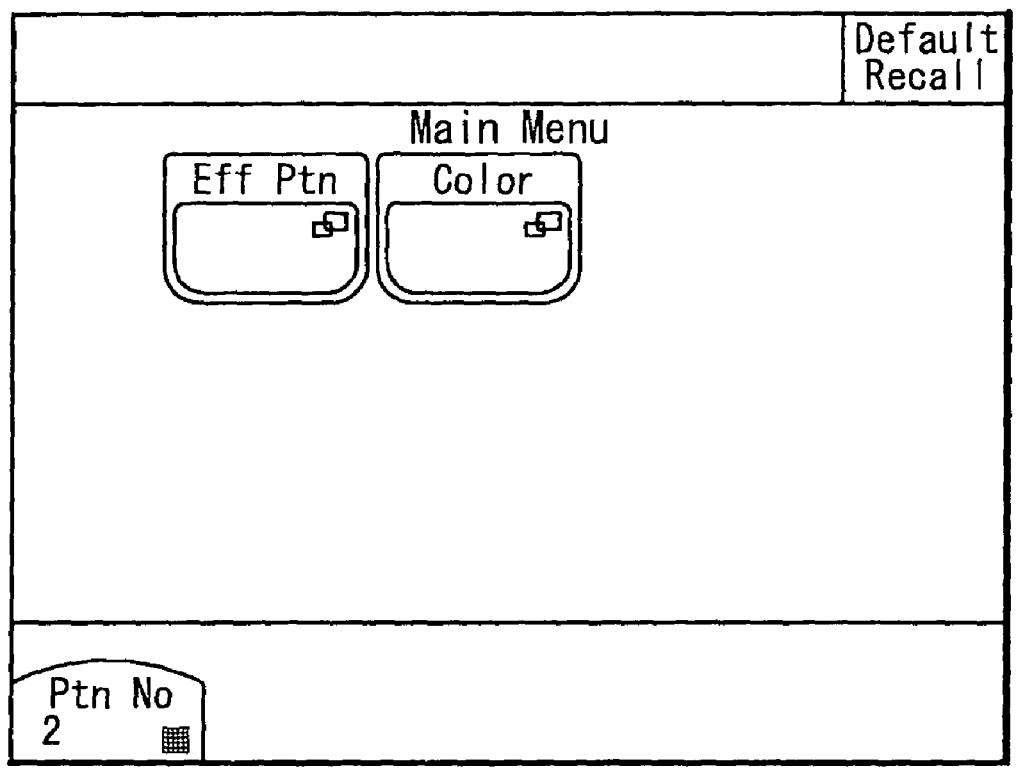
FIG. 3 is a view showing a GUI screen for initialization in a switcher of related art.
Figure 4:
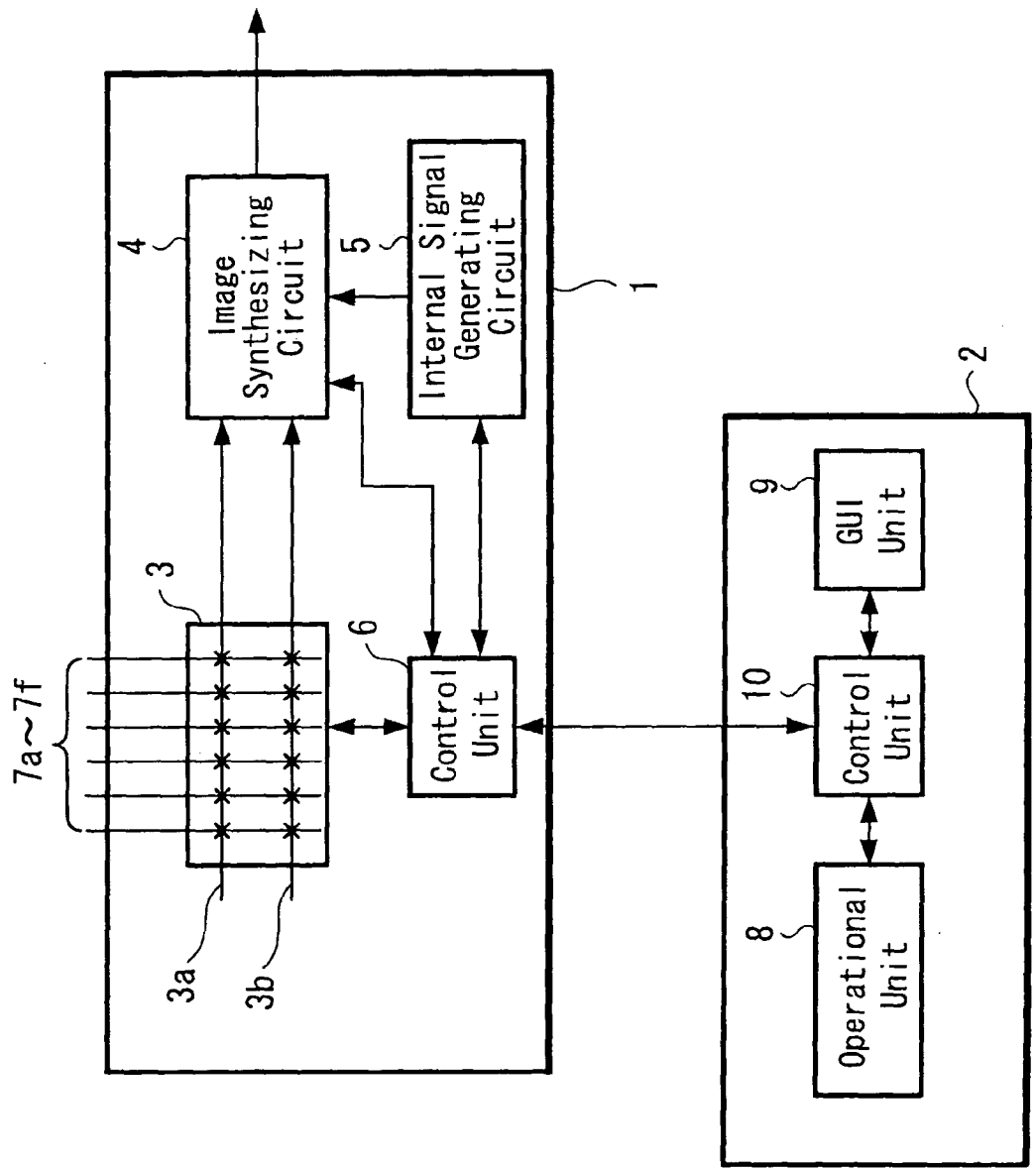
FIG. 4 is a block diagram showing the whole configuration of a switcher to which an embodiment of the present invention is applied.

Hereinafter, an embodiment of the present invention, to which a switcher for broadcasting is applied, is specifically explained with reference to the drawings. FIG. 4 is a block diagram showing a schematic configuration of a switcher to which an embodiment of the present invention is applied. The switcher is configured to have a switcher body 1 and a control panel 2.

The switcher body 1 includes an input selecting circuit 3, an image synthesizing circuit 4, an internal signal generating circuit 5 and a control unit 6. Further, video signals from two or more channels (video signals from video cameras and VTRs, etc.) are input to the switcher body 1 from input lines 7a to 7f.

The input selecting circuit 3 includes a selective switch group in matrix shape that connects each of the input lines 7a to 7f to input buses 3a, 3b, and a video signal from one input line can be selected in each of the input buses 3a, 3b. Two video signals selected from the input buses 3a, 3b are transmitted to the image synthesizing circuit 4.

The image synthesizing circuit 4 applies an effect, by which transition is made from one video signal to the other video signal out of the two video signals selected by the input selecting circuit 3, to the video signal output from the switcher body 1.

The internal signal generating circuit 5 generates a video signal used to display a boundary line between two video signals when the image synthesizing circuit 4 applies the effect, and the video signal generated by this internal signal generating circuit 5 is also transmitted to the image synthesizing circuit 4.

The control unit 6 is configured to have a micro computer and a communication interface, and controls the whole of the switcher body 1 based on information transmitted from the control panel 2.

The control panel 2 includes an operational unit 8, a GUI unit 9 and a control unit 10. Although not illustrated in the figure, the operational unit 8 includes various operational portions (an operational button for selecting a video signal in the input selecting circuit 3, a fader lever for manually adjusting an output ratio of two video signals from the image synthesizing circuit 4, etc.) for operating the switcher body 1.

The GUI unit 9 is provided to perform settings of various items for operating the switcher body 1 before the switcher body 1 is operated by the operational unit 8. The GUI unit 9 is configured to have a liquid crystal display with a touch panel, and the settings are performed on the GUI screen displayed on this liquid crystal display.

The control unit 10 is configured to have a micro computer and a communication interface, and transmits information indicating an operational result in the operational unit 8 and a setting result in the GUI unit 9 to the control unit 6 in the switcher body 1.

In the GUI unit 9, regarding an effect for example, parameters can arbitrarily be input to a plurality of setting items including the following items (1) to (3):

(1) effect pattern;

(2) item relating to color of boundary line between two video signals on which transition is made; and (3) position and width of the boundary line appeared.

Figures 5A, 5B:
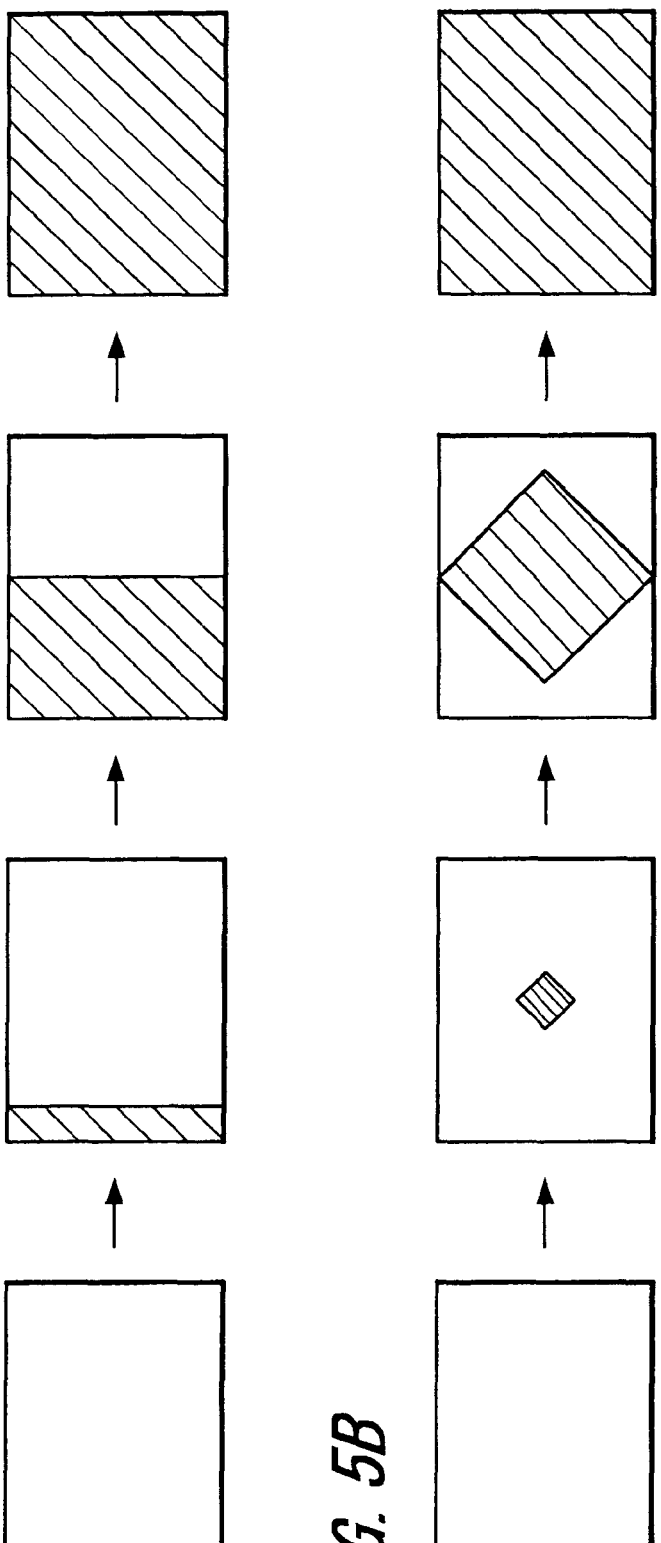
FIGS. 5A and 5B are diagrams showing examples of an effect pattern.

FIGS. 5A and 5B are diagrams showing examples of the pattern capable of being set as the above item (1). When inputting a certain pattern number (integer number) as a parameter relating to an effect pattern, such pattern is set in which a different image (indicated with a slash line) appears from one end of the screen displaying an image at present (indicated with a white ground), as shown in FIG. 5A. Then, the ratio of the different image gradually increases, and finally the different image completely replaces the image at present.

Further, when another pattern number is input as a parameter relating to an effect pattern, such pattern is set in which a different image (indicated with a slash line) appears from within the screen displaying an image at present (indicated with a white ground), as shown in FIG. 5B. Then, the ratio of the different image gradually increases, and finally the different image completely replaces the image at present.

The above item (2) is provided for the settings of luminance, saturation and hue (for example, setting to bright, vivid blue, or to dark muddy red) of the boundary line (a vertical line in FIG. 5A and a line forming a diamond shape in FIG. 5B) between the two video signals on which transition is made as shown in FIGS. 5A and 5B. Parameters of luminance, saturation and hue are input with a decimal value (numerical value with two decimal places), respectively.

Figure 6A:
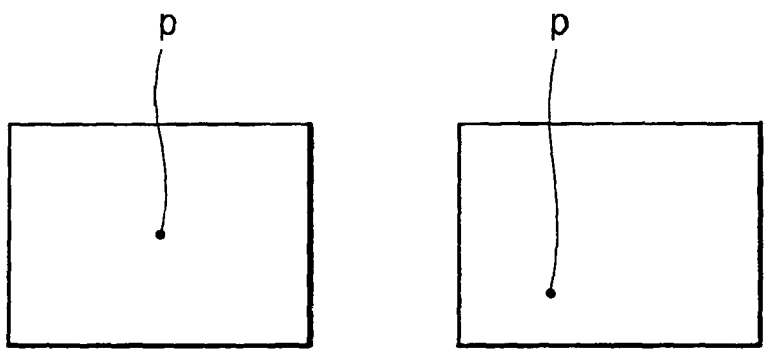
FIGS. 6A and 6B are diagrams showing examples of a position and width of a boundary line.
Figure 6B:
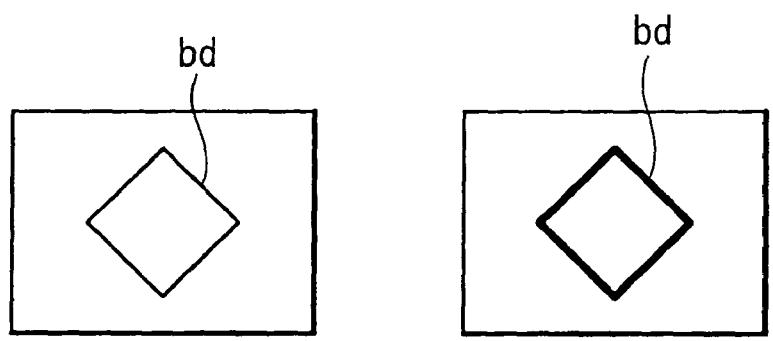

The above item (3) is provided for the settings of a position and width of the boundary line appeared as shown in FIGS. 5A and 5B. FIGS. 6A and 6B are diagrams showing the appeared position and width of the diamond-shaped boundary line in an example of the effect pattern shown in FIG. 5B.

FIG. 6A is a diagram showing an example of a position appeared, and a position p appeared to be a diamond shape is set in the center of screen in a figure on the left side, and the position p is appeared toward the lower left deviating from the center of screen in a figure on the right side. Regarding a position appeared, a parameter that represents the center of screen is defined as "0", and a parameter of a position in the horizontal direction of the screen is input in the range of −4.00 to 4.00, and a parameter of a position in the vertical direction of the screen is input in the range of −3.00 to 3.00.

FIG. 6B is a diagram showing an example of a setting result of the width, and the width of the diamond-shaped boundary line bd is thin in the figure on the left side and the width of the diamond-shaped boundary line bd is thick in the figure on the right side. A parameter of the width is also input by a decimal value (numerical value with two decimal places).

Among those setting items (1) to (3), an initial value was set in a factory for the items (2) and (3), and the initial value can be changed on the GUI screen by a user. However, as for the item (1), the initial value does not exist (no initial value has been set regarding the pattern number, and only the effect whose pattern number is input as a parameter by the user is implemented).

As described above, items having initial values and items not having initial values coexist with respect to items set for the switcher body 1. The control unit 10 (shown in FIG. 4) separately stores various setting items for the switcher body 1 by discriminating the items having initial values and the items not having initial values, and also stores initial values at present regarding the items having initial values (initial values set in a factory in the case where a user has not changed the initial values, and initial values after the change in the case where the user has changed the initial values). Further explaining the storage of the initial values, the apparatus includes the function of storing a value set by a user as the present initial value for each item. The user can set an initial value (User Default) and can return the present initial value to the value set at the time of factory shipment (Factory Default) when canceling the User Default. The setting of such initial value can be obtained easily by using the GUI screen.

Figure 7:
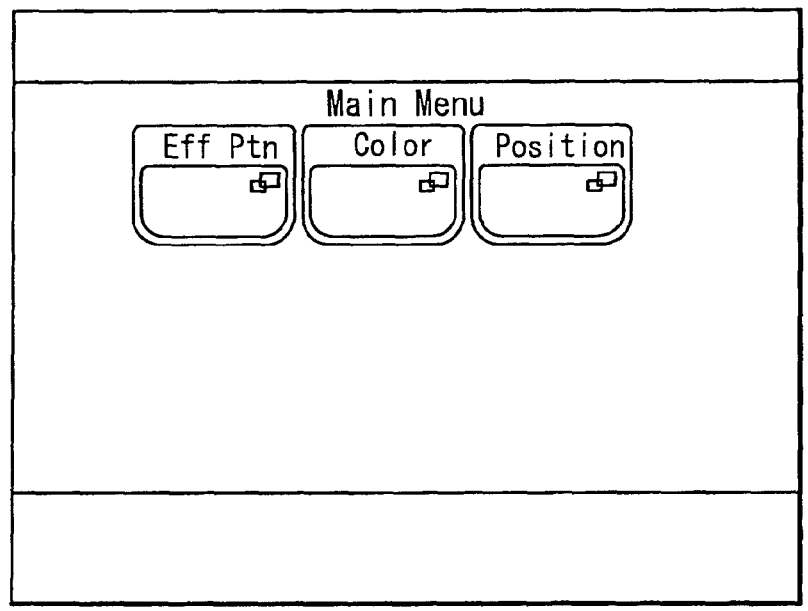
FIG. 7 is a view showing a GUI screen for initialization in the switcher in FIG. 4.

FIG. 7 is a view showing a GUI screen displayed in the GUI unit 9 to input parameters relating to those setting items and to initialize individual setting items. A plurality of icons indicating grouped setting items are displayed in a main menu column in the center of the screen. Among the icons displayed, an "Eff Ptn" is that relating to the effect of the above (1). A "Color" is that relating to the color of the boundary line of the above (2). A "position" is that relating to the appeared position and width of the boundary line of the above (3). It should be noted that in the attached drawings including FIG. 7, only the display that relates to the characteristics according to the embodiment is indicated on the GUI screen, however, many other characters, icons and the like are displayed on the GUI screen in a practical apparatus.

Figure 8:
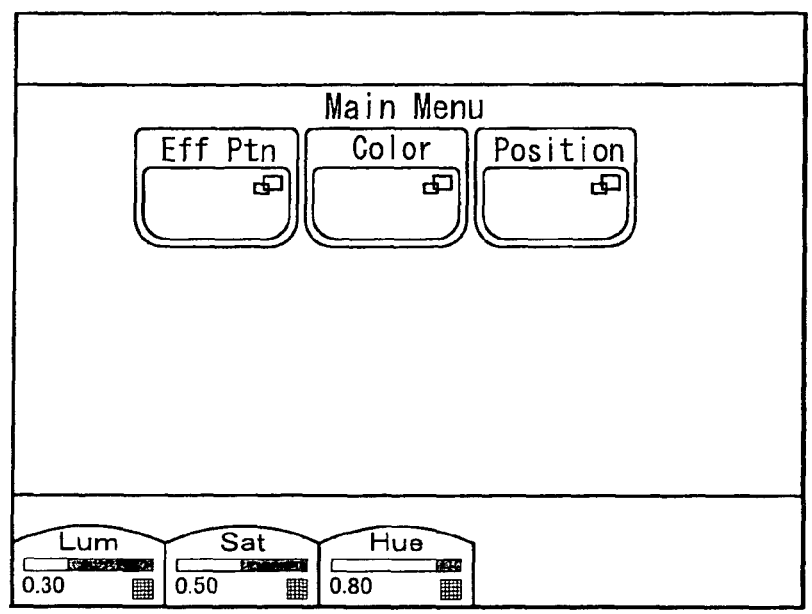
FIG. 8 is a view showing a GUI screen for initialization in the switcher in FIG. 4.

For example, a user pushes the icon "Color" in the main menu on the GUI screen. Then, as shown in FIG. 8, three icons "Lum", "Sat" and "Hue" that represent luminance, saturation and hue respectively, which are setting items regarding the color of the boundary line, are displayed on the bottom side of the screen. Parameter values on the present luminance, saturation and hue are displayed using a bar graph and numerical value in respective icons "Lum", "Sat", "Hue". As mentioned above, initial values exist regarding the luminance, saturation and hue of the boundary line.

For example, the user pushes the icon "Lum" in the case where the user intends to initialize the setting regarding the luminance of the boundary line. Then, a pop-up screen as shown in FIG. 9 is displayed with another window in the GUI unit 9 separately from the screen shown in FIG. 8 under the control of the control unit 10 (shown in FIG. 4).

A "Default Recall" button 22 used for initialization is displayed on the pop-up screen as well as a numeric keypad 21. In addition, a display column 23 where a numerical value input by the numeric keypad 21 and a "Close" button 24 for closing the pop-up screen are also displayed. Since the "Default Recall" button 22 is displayed on the pop-up screen, the user can easily assume that the button 22 is provided to initialize a target setting item "Lum" (luminance) at present. Further, the user can check easily and exactly that the luminance of the boundary line is an item capable of being initialized.

When the user pushes the "Default Recall" button 22 on the pop-up screen, the control unit 10 returns the parameter of the luminance of the boundary line to the initial value and the pop-up screen is closed. Further, although not shown in the drawing, the bar graph and numerical value in the icon "Lum" on the screen in FIG. 8 are changed to show the initial value under the control of the control unit 10.

Figure 9:
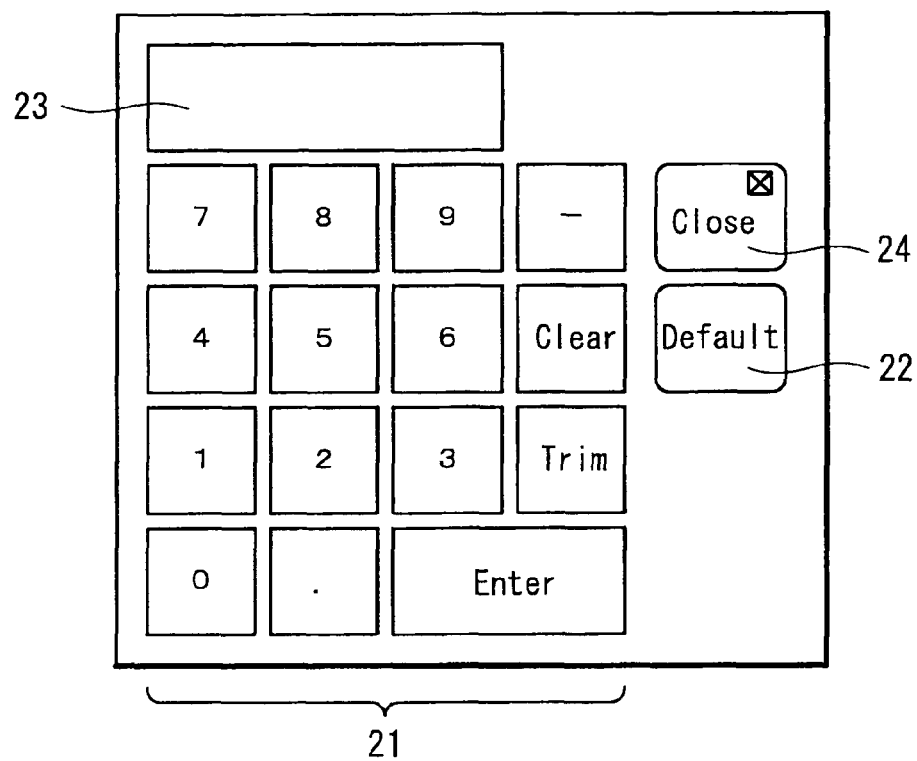
FIG. 9 is a view showing a GUI screen for initialization in the switcher in FIG. 4.

Also, in the case where the icon "Sat" is pushed on the screen in FIG. 8, the same pop-up screen as that shown in FIG. 9 is displayed. Then, when the "Default Recall" button 22 is pushed, the control unit 10 returns the parameter of the saturation of the boundary line to the initial value and this pop-up screen is closed. Then, the bar graph and numerical value in the icon "sat" on the screen in FIG. 8 are changed to show the initial value.

Also, in the case where the icon "Hue" is pushed on the screen in FIG. 8, the same pop-up screen as that shown in FIG. 9 is displayed. Then, when the "Default Recall" button 22 is pushed, the control unit 10 returns the parameter of the hue of the boundary line to the initial value and this pop-up screen is closed. Then, the bar graph and numerical value in the icon "Hue" on the screen in FIG. 8 are changed to show the initial value.

It should be noted that when an arbitrary parameter is input using the numeric keypad 21 instead of pushing the "Default Recall" button 22 after the pop-up screen in FIG. 9 was displayed by pushing the icon "Lum", "Sat" or "Hue" on the screen in FIG. 8 and an "Enter" key is pushed, the control unit 10 sets the luminance, saturation or hue of the boundary line in accordance with the input result, and this pop-up screen is closed. Then, the bar graph and numerical value in the icon "Lum", "Sat" or "Hue" on the screen in FIG. 8 are changed to show the value input by the numeric keypad 21 under the control of the control unit 10.

Further, when the "Close" button 24 is pushed instead of pushing the "Default Recall" button 22 after the pop-up screen in FIG. 9 was displayed, this pop-up screen is immediately closed.

Figure 10:
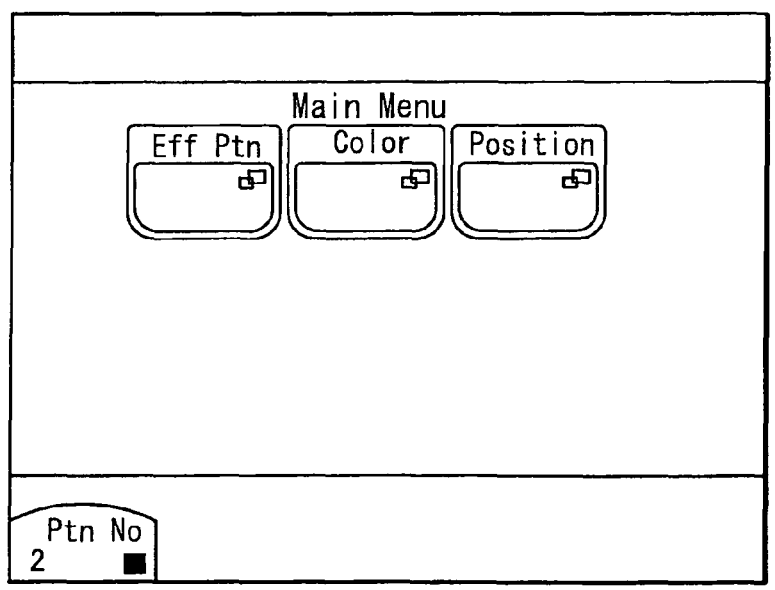
FIG. 10 is a view showing a GUI screen for initialization in the switcher in FIG. 4.

For example, the user pushes the icon "Eff Ptn" in the main menu on the GUI screen in FIG. 7. Then, as shown in FIG. 10, the icon "Ptn No" that represents the effect pattern (see FIGS. 5A and 5B) is displayed on the bottom side of the screen. A pattern number set at present is displayed in the icon "Ptn No". As mentioned above, regarding this pattern number, the initial value does not exist.

Figure 11:
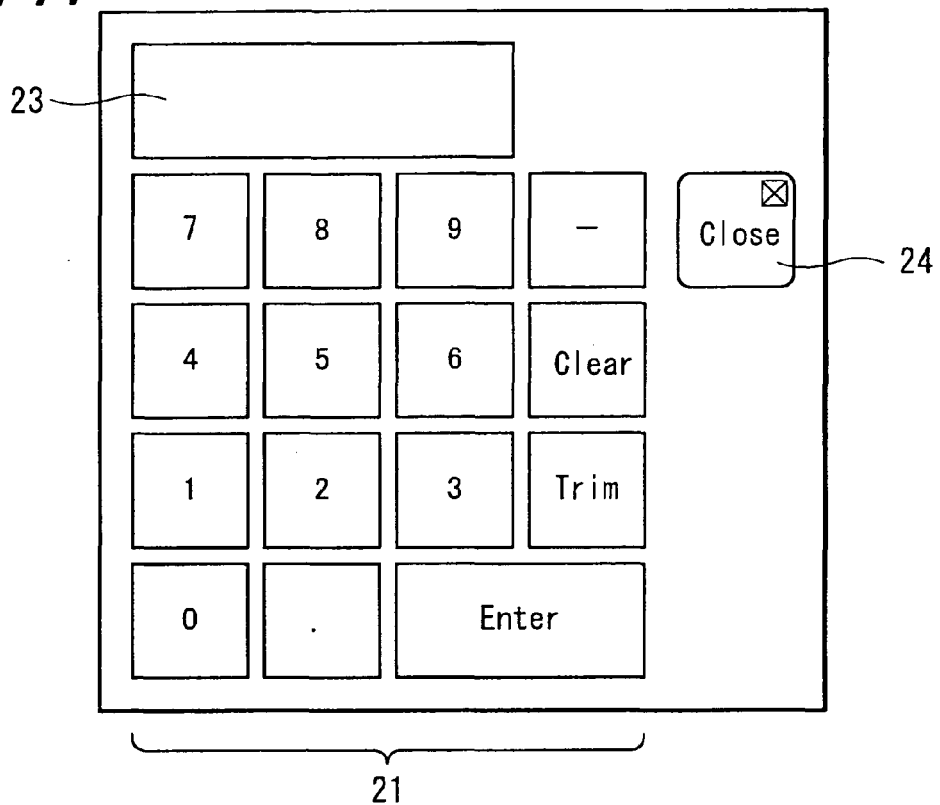
FIG. 11 is a view showing a GUI screen for initialization in the switcher in FIG. 4.

If the user pushes the icon "Ptn No" to initialize the effect pattern, a pop-up screen as shown in FIG. 11 is displayed in the GUI unit 9 with another window separately from the screen in FIG. 10 under the control of the control unit 10.

Although the same numeric keypad 21, display column 23 and "Close" button 24 as those on the pop-up screen shown in FIG. 9 are displayed on the pop-up screen, the "Default Recall" button such as that on the pop-up screen in FIG. 9 is not displayed. Since the "Default Recall" button is not displayed on the pop-up screen, the user can check easily and exactly that the effect pattern is an item incapable of being initialized.

After the user checks that the effect pattern may not be initialized as described above, the pop-up screen is immediately closed by pushing the "Close" button 24. Alternatively, as a measure equivalent to the initialization, the effect pattern can be set again immediately by the numeric keypad 21 (in that case, the pattern number in the icon "Ptn No" on the screen in FIG. 10 is changed to show the value input by the numeric keypad 21 under the control of the control unit 10).

Figure 12:
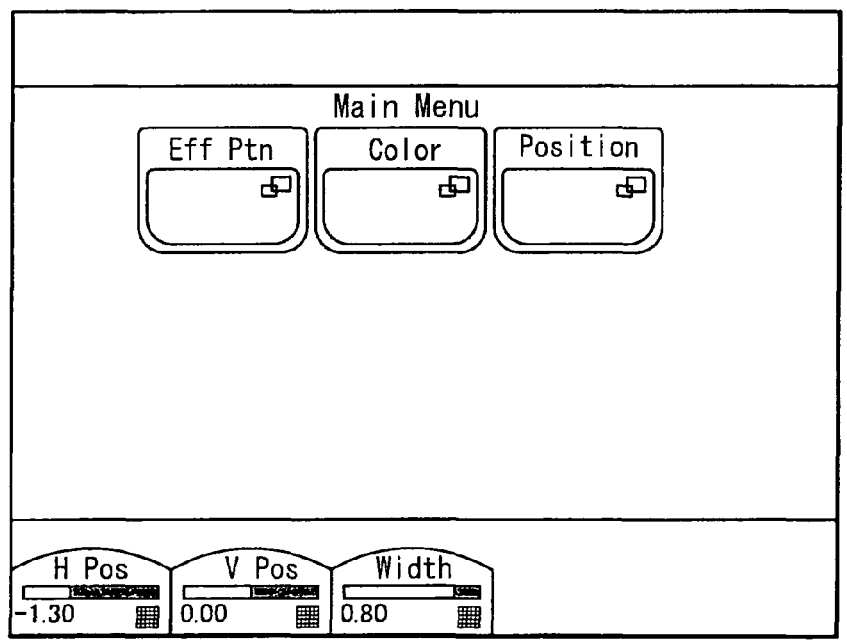
FIG. 12 is a view showing a GUI screen for initialization in the switcher in FIG. 4.

For example, the user pushes the icon "Position" in the main menu on the GUI screen in FIG. 7. Then, as shown in FIG. 12, three icons "H Pos", "V Pos" and "Width", which represent respectively a position of the boundary line appeared in the horizontal direction, a position thereof appeared in the vertical direction and the width thereof (see FIGS. 6A and 6B) are displayed on the bottom side of the screen. In respective icons "H Pos", "V Pos" and "Width" are displayed the parameter values on the position appeared in the horizontal direction, on the position appeared in the vertical direction and on the width at present by the bar graph and numerical value. As is mentioned above, regarding the appeared position and width of the boundary line, the initial value exists.

For example, the user pushes the icon "H Pos" in the case of initializing the setting regarding the position appeared in the horizontal direction of the boundary line. Then, under the control of the control position 10, a pop-up screen as shown in FIG. 13 is displayed in the GUI unit 9 with another window separately from the screen in FIG. 12.

The pop-up screen is the same as that shown in FIG. 9. Since the "Default Recall" button 22 is displayed on this pop-up screen, the user can check easily and exactly that the position appeared in the horizontal direction of the boundary line is an item capable of being initialized.

When the user pushes the "Default Recall" button 22 on the pop-up screen, the control unit 10 returns the parameter of the position appeared in the horizontal direction of the boundary line to the initial value, and this pop-up screen is closed. Further, under the control of the control unit 10, the bar graph and numerical value in the icon "H Pos" on the screen in FIG. 12 are changed to show the initial value.

Figure 13:
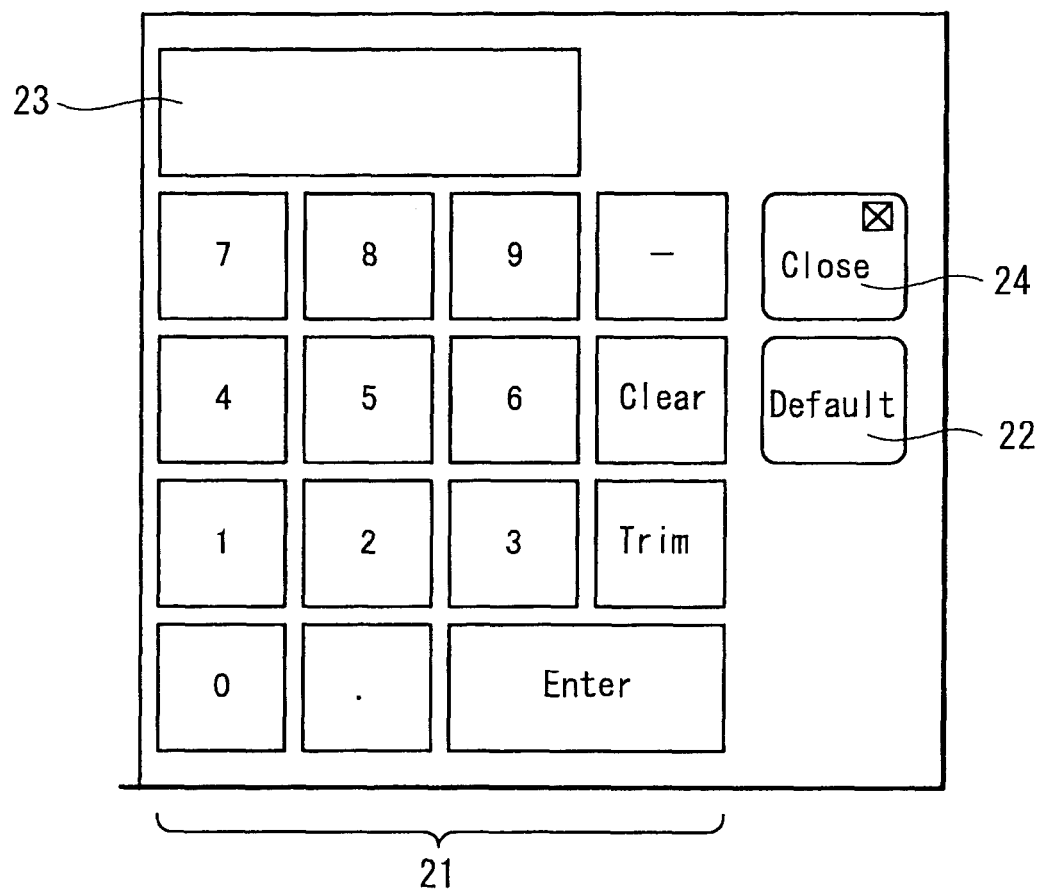
FIG. 13 is a view showing a GUI screen for initialization in the switcher in FIG. 4.

Further, in the case where the icon "V Pos" is pushed on the screen in FIG. 12, the same pop-up screen as that shown in FIG. 13 is displayed. Then, when the "Default Recall" button 22 is pushed, the control unit 10 returns the parameter of the position appeared in the vertical direction of the boundary line to the initial value and this pop-up screen is closed. Then, the bar graph and numerical value in the icon "V Pos" on the screen in FIG. 12 are changed to show the initial value.

Further, in the case where the icon "width" is pushed on the screen in FIG. 12, the same pop-up screen as that shown in FIG. 13 is displayed. Then, when the "Default Recall" button 22 is pushed, the control unit 10 returns the parameter of the position appeared in the vertical direction of the boundary line to the initial value and this pop-up screen is closed. Then, the bar graph and numerical value in the icon "Width" on the screen in FIG. 12 are changed to show the initial value.

Further, when an arbitrary parameter is input using the numeric keypad 21 instead of pushing the "Default Recall" button 22 after the pop-up screen in FIG. 13 was displayed by pushing the icon "H Pos", "V Pos" or "Width" on the screen in FIG. 12 and an "Enter" key is pushed, the control unit 10 sets the position appeared in the horizontal direction of the boundary line, the position appeared in the vertical direction thereof and the width thereof in accordance with the input result, and this pop-up screen is closed. Then, the bar graph and numerical value in the icon "H Pos", "V Pos" or "Width" on the screen in FIG. 8 are changed to show the value input by the numeric keypad 21 under the control of the control unit 10.

Further, when the "Close" button 24 is pushed instead of pushing the "Default Recall" button 22 after the pop-up screen in FIG. 13 was displayed, this pop-up screen is immediately closed.

Hence, regarding the above-described switcher, a user can check easily and exactly whether a setting item specified to be initialized on the GUI screen in FIG. 7 is capable of being initialized, based on the "Default Recall" button being displayed or not on the pop-up screen (see FIGS. 9, 11 and 13). Therefore, the initializing operation (operation of the "Default Recall" button) can be implemented only in the case where the item is capable of being initialized. Accordingly, an unnecessary operation on the items incapable of being initialized is prevented and the operability when initializing individual setting items can be improved.

It should be noted that in the above-described embodiment an item desired to be initialized is specified by pushing the icon of the "Lum", "Sat", "Hue", "Ptn No" or the like displayed on the bottom side of the GUI screen in FIG. 7, and then the pop-up screen with the numeric keypad is displayed after pushing that icon.

However, there is provided another embodiment in which a unique item number is given to each of setting items including luminance, saturation, hue of the boundary line, an effect pattern, or the like, and a numeric keypad is displayed on the GUI screen in advance. Then, the setting item desired to be initialized may be specified by inputting the item number using the numeric keypad. A "Default Recall" button may be displayed in the vicinity of the numeric keypad in the case where an item number of the item having an initial value in a parameter is input. The "Default Recall" button may not be displayed in the case where an item number of the item not having an initial value in the parameter is input. Accordingly, the numeric keypad to input parameters can also be used as a tool to specify the setting item desired to be initialized.

In addition, in the above embodiment, when the "Default Recall" button 22 is pushed on the pop-up screen in FIG. 9, this pop-up screen is closed.

However, there is provided another embodiment in which the operation by the "Default Recall" button 22 may be performed in the following manner. The parameter is not immediately returned to the initial value but the initial value is displayed in the display column 23 on the pop-up screen in the numeric keypad, when the "Default Recall" button 22 is pushed. Then, if the "Enter" key is pushed, that value is fixed, more specifically, the parameter will be the initial value. On the other hand, if the "Close" button 24 is pushed, the pop-up screen is closed without that value being the initial value and doing anything. According to this embodiment, whether the value is practically applied as the initial value can be judged after checking the content of the initial value on the pop-up screen. Particularly, it is useful for a user to check the value before application in the case where the user has set up the initial value.

Furthermore, although the above-mentioned embodiments are applied to a switcher, embodiments of the present invention can be applied to any electronic apparatus for commercial/consumer use including a GUI and being controlled by parameters relating to a plurality of setting items including an item having an initial value. Moreover, embodiments of the present invention can be applied to any electronic apparatus for commercial/consumer use being controlled by using parameters relating to a plurality of setting items including an item having an initial value and an item not having an initial value coexisted.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus controlled by using parameters relating to a plurality of setting items, comprising:
    specifying means for performing an operation of specifying a setting item out of said plurality of setting items;
    display processing means for displaying a numeric keypad to input a parameter relating to said specified setting item and an initialization icon to initialize said specified setting item on a graphical user interface screen in the case of the setting item specified by said specifying means being an item having an initial value in the parameter, and for not displaying said initialization icon in the case of said specified setting item being an item not having an initial value in the parameter; and
    initialization processing means for returning the parameter of said specified setting item to said initial value based on an operation of said initialization icon,
    wherein the display of the initialization icon is determined based on whether the setting item has an initial value,
    wherein the plurality setting items set initial parameters for at least an effect pattern, a color of boundary lines, and a width of the boundary lines for a transition from a first video signal to a second video signal, and
    wherein the initialization processing means returns a user-set parameter of said specified setting item to a value set upon a factory shipment of the electronic apparatus by the operation of the initialization icon.

2. An electronic apparatus according to claim 1, wherein:
    said specifying means is an icon representing an individual setting item on a graphical user interface screen; and
    said display processing means displays a pop-up screen where said numeric keypad is provided, based on an operation of said icon, and displays said initialization icon on said pop-up screen in the case of an icon representing an item having an initial value in the parameter being operated.

3. An electronic apparatus according to claim 2, wherein said display processing means further displays on said pop-up screen an icon for immediately closing said pop-up screen.

4. An electronic apparatus according to claim 1, wherein:
    a unique item number is given to each of said setting items; and
    said specifying means is executed by inputting said item number using said numeric keypad.

5. An electronic apparatus according to claim 1, further comprising:
    an input selecting circuit for selecting a video signal out of video signals of two or more channels to be input;
    an image synthesizing circuit for applying an effect of causing a transition of an output video signal from one video signal out of two video signals selected by said input selecting circuit to the other video signal thereof; and
    an internal signal generating circuit for generating a video signal to display a boundary line between said two video signals, wherein:
    said plurality of setting items includes
        items regarding colors of the video signal generated by said internal generating circuit and
        patterns of the effect applied by said image synthesizing circuit;
    the initial value exists regarding the items relative to colors of the video signal generated by said internal generating circuit; and
    no initial value exists regarding the patterns of the effect applied by said image synthesizing circuit.

6. A method of initializing setting items in an electronic apparatus controlled by using parameters relating to a plurality of setting items, comprising the steps of:
    displaying a numeric keypad to input a parameter relating to a specified setting item and an initialization icon to initialize said specified setting item on a graphical user interface screen in the case of said specified setting item having an initial value in the parameter, and not displaying said initialization icon in the case of said specified setting item not having an initial value in the parameter, based on an operation of specifying the setting item out of said plurality of setting items; and
    returning the parameter of said specified setting item to said initial value, based on an operation of said initialization icon,
    wherein the display of the initialization icon is determined based on whether the setting item has an initial value,
    wherein the plurality setting items set initial parameters for at least an effect pattern, a color of boundary lines, and a width of the boundary lines for a transition from a first video signal to a second video signal, and
    wherein the returning step returns a user-set parameter of said specified setting item to a value set upon a factory shipment of the electronic apparatus by the operation of the initialization icon.

7. An electronic apparatus controlled by using parameters relating to a plurality of setting items, comprising:
    a specifying unit performing an operation of specifying a setting item out of said plurality of setting items;
    a display processing unit displaying on a graphical user interface screen a numeric keypad to input a parameter relating to said specified setting item and an initialization icon to initialize said specified setting item;
    an initial value storing unit storing initial values set/changed regarding said plurality of setting items; and
    an initialization processing unit returning the parameter of said specified setting item to said initial value based on an operation of said initialization icon,
    wherein the display of the initialization icon is determined based on whether the setting item has an initial value,
    wherein the plurality setting items set initial parameters for at least an effect pattern, a color of boundary lines, and a width of the boundary lines for a transition from a first video signal to a second video signal, and wherein the initialization processing unit returns a user-set parameter of said specified setting item to a value set upon a factory shipment of the electronic apparatus by the operation of the initialization icon.

8. An electronic apparatus controlled by using parameters relating to a plurality of setting items, comprising:
a specifying unit performing an operation of specifying a setting item out of said plurality of setting items;
a display processing unit displaying a numeric keypad to input a parameter relating to said specified setting item and an initialization icon to initialize said specified setting item on a graphical user interface screen in the case of the setting item specified by said specifying unit being an item having an initial value in the parameter, and not displaying said initialization icon in the case of said specified setting item being an item not having an initial value in the parameter; and
an initialization processing unit returning the parameter of said specified setting item to said initial value based on an operation of said initialization icon,
wherein the display of the initialization icon is determined based on whether the setting item has an initial value,
wherein the plurality setting items set initial parameters for at least an effect pattern, a color of boundary lines, and a width of the boundary lines for a transition from a first video signal to a second video signal, and
wherein the initialization processing unit returns a user-set parameter of said specified setting item to a value set upon a factory shipment of the electronic apparatus by the operation of the initialization icon.

* * * * *